United States Patent [19]

Bindloss et al.

[11] 4,397,929
[45] Aug. 9, 1983

[54] PROCESS FOR GENERATING A LATENT MAGNETIC IMAGE

[75] Inventors: William Bindloss; Fredrick C. Zumsteg, Jr., both of Wilmington, Del.

[73] Assignee: E. I. Du Pont De Nemours & Co., Wilmington, Del.

[21] Appl. No.: 274,756

[22] Filed: Jun. 18, 1981

[51] Int. Cl.³ .............................................. G03G 19/00
[52] U.S. Cl. ..................................... 430/39; 346/74.4; 360/59
[58] Field of Search ......................... 430/39; 346/74.4; 360/59

[56] References Cited

U.S. PATENT DOCUMENTS

| | | | |
|---|---|---|---|
| 3,521,294 | 7/1970 | Treves | 360/59 |
| 3,555,556 | 1/1971 | Nacci | 346/74.4 |
| 3,613,100 | 10/1971 | Kaufer et al. | 360/59 X |
| 3,845,306 | 10/1974 | Kohlmannsperger | 430/39 |
| 4,294,901 | 10/1981 | Genovese | 430/39 |

Primary Examiner—Roland E. Martin, Jr.

[57] ABSTRACT

In forming a latent magnetic image by imagewise demagnetization of a magnetized layer, less than the entire thickness of the exposed area is demagnetized so as to induce a magnetization of opposite polarity in the demagnetized area, thus reducing the net strength of the residual and induced magnetic fields within the exposed areas.

4 Claims, 6 Drawing Figures

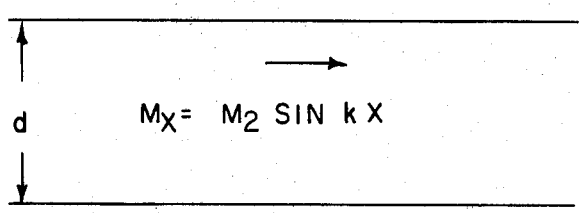
F I G. 1
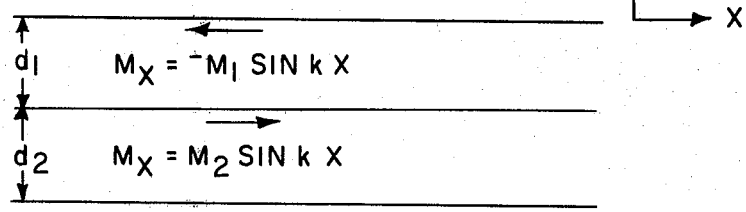
F I G. 2
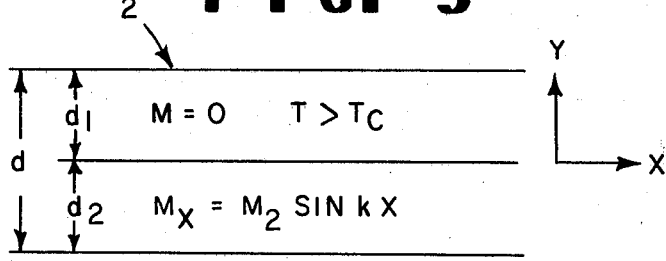
F I G. 3

F I G. 4
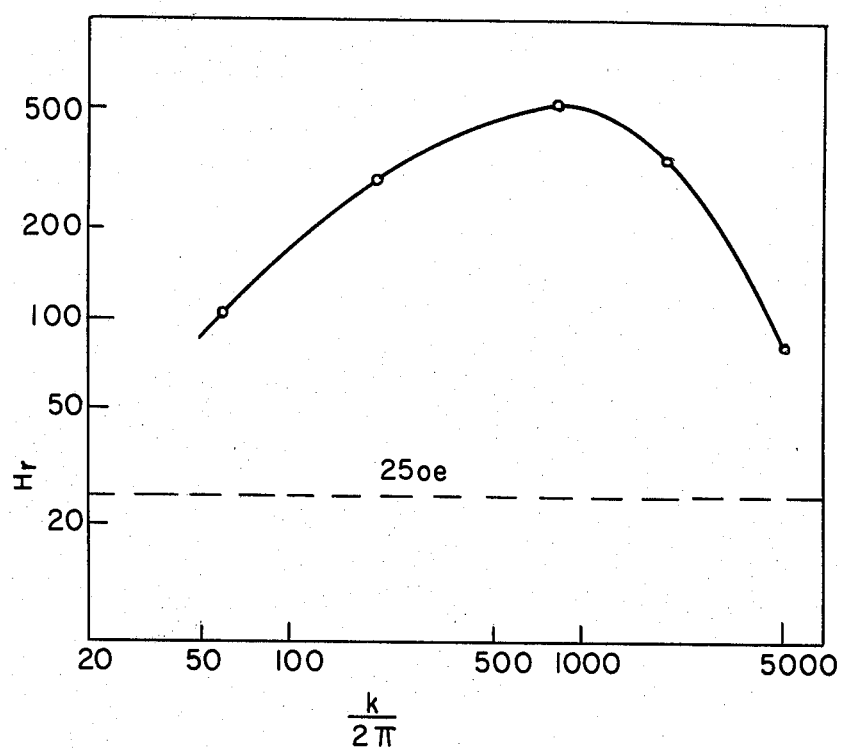
F I G. 5
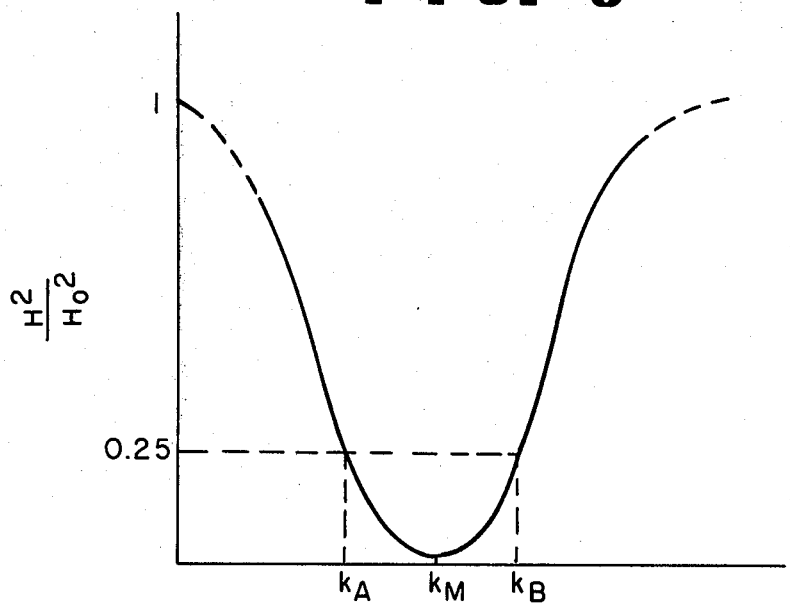

PROCESS FOR GENERATING A LATENT MAGNETIC IMAGE

FIELD OF INVENTION

The invention relates to thermomagnetic imaging and, more particularly, to the production of a latent magnetic image on a magnetizable layer preferably coated upon a supporting base.

BACKGROUND OF THE INVENTION

The generation of a magnetic latent image on a magnetizable layer coated on a supporting base is well known in the art. The first demonstration is believed to date back as far as 1839 to the experiments of A. W. Jones. These involved creating a latent magnetic image by writing on a blackened iron plate with a magnetized stylus.

Thermal magnetography, as a process of producing a latent image on a ferromagnetic layer through the use of selective imagewise heating of the layer, has since become quite widely known. However, in common with most nonsilver halide imaging systems, this process suffers from low photographic speed. That is, a substantial amount of energy is required to selectively change the property of selected portions of the imaged surface to provide an adequate signal that can be used to read out the changed portions.

When using thermal magnetography to create the latent magnetic image, an alternating magnetic pattern is typically impressed on the surface by one of several methods with from about 50 to 4000 magnetic flux reversals per inch (19.7 to 1574.8 per cm) and preferably from 100 to 3000 magnetic flux reversals per inch (39.37 to 1181.1 per cm). It should be noted that one cycle per inch is comprised of two flux reversals per inch.

Frequently, the surface of the magnetic layer is thermoremanently structured by placing the magnetic member having a continuously coated surface of magnetic material on top of a magnetic master recording of the desired periodic pattern. An external energy source is then applied to heat the surface of the magnetic member above its Curie temperature. As the surface of the magnetic member cools below its Curie temperature, it is thermoremanently magnetized by the periodic magnetic signal from the magnetic master recording. When acicular chromium dioxide is used as the magnetic material in the surface of the magnetic member, as little as 25 oersteds can be used to structure the surface of the magnetic member when passing through the Curie temperature, whereas over 200 oersteds are needed to impose detectable magnetism to acicular chromium dioxide at room temperature.

Alternatively a magnetic recording head extending the full width of the magnetic layer may be used to impose an alternating magnetic pattern on the layer in much the same way as sound recordings are made on a moving magnetic tape.

As early as 1971, G. R. Nacci, in U.S. Pat. No. 3,555,556 disclosed the basic process of thermomagnetic recording and further disclosed that, in the process of demagnetizing imagewise a premagnetized magnetic layer comprising acicular thermomagnetic particles in a binder coated on a nonmagnetic support surface, the demagnetization does not need to be carried out completely throughout the thickness of the layer, but that adequate imaging may be obtained even with partial depthwise demagnetization of the layer. An important application of the use of thermal magnetography is shown in U.S. patent application Ser. No. 173,871, filed July 30, 1980 and now U.S. Pat. No. 4,338,391. In this application, a latent magnetic image is read out by decorating it with toner particles which are then transferred under pressure to a heated substrate.

As the use of thermal magnetography becomes more widespread, it is, of course, increasingly desirable that the latent magnetic image necessary for use in many of those applications be produced in the most energy efficient manner in order to permit higher image generation speeds and to incur less power waste. In practical applications where the magnetic layer contains a resin binder, the lower energy input results in less heating of the binder, which, in turn, eliminates some of the troublesome problems such as thermal distortion and degradation of the resin binder.

BRIEF SUMMARY OF THE INVENTION

In view of the problems of the prior art, the invention is directed to a process for generating a latent magnetic image in which a larger magnetic field gradient between exposed and unexposed areas of a patterned magnetic layer is obtained by coordinating the frequency of the pattern with the energy source used to effect demagnetization in such a manner as to demagnetize the layer through less than its entire thickness and thereby obtain even better magnetic field gradient between the exposed (demagnetized) and unexposed (magnetized) areas of the layer.

More particularly, the invention is directed to a process for generating a latent magnetic image on a ferromagnetic layer having imposed thereon an alterating magnetic pattern comprising the sequential steps of (1) in imagewise fashion exposing the layer to heating radiation by which exposed areas of the layer are heated above the Curie temperature of the ferromagnetic material and demagnetized, and (2) cooling the layer to ambient temperature, in which the magnetic field gradients between the demagnetized and magnetized areas are improved by: (a) adjusting the intensity and duration of the heating radiation exposure so that the Curie temperature of the layer is exceeded and the layer is demagnetized through less than the complete thickness of the layer and (b) adjusting the frequency of the alternating magnetic pattern so that the residual magnetic field from the magnetic layer underlying the demagnetized areas of the layer is sufficiently high to induce in the demagnetized area of the layer upon cooling a magnetization of opposite polarity producing a magnetic field of sufficient magnitude that the net strength of the residual field and the field due to the induced magnetization on the exposed areas of the layer is less than 50% of the magnetic field strength of the unexposed areas of the layer.

BRIEF DESCRIPTION OF THE DRAWING

The drawing consists of six figures as follows:

FIG. 1 is a schematic diagram of a section of an unexposed area of a magnetized layer showing the magnetization therein;

FIG. 2 is a schematic diagram of a section of an exposed area of the magnetized layer showing the magnetization therein;

FIG. 3 is a schematic diagram of a section of an exposed area of the magnetized layer at its Curie temperature;

FIG. 4 is a plot of the mathematical relationship of relative field strength of the remagnetized layer as a function of the frequency of the imposed magnetic pattern.

FIG. 5 is a plot of the mathematical relationship between the relative field strength of the premagnetized and remagnetized layers as a function of the frequency of the imposed magnetic pattern.

DETAILED DESCRIPTION OF THE INVENTION

Figure 6:
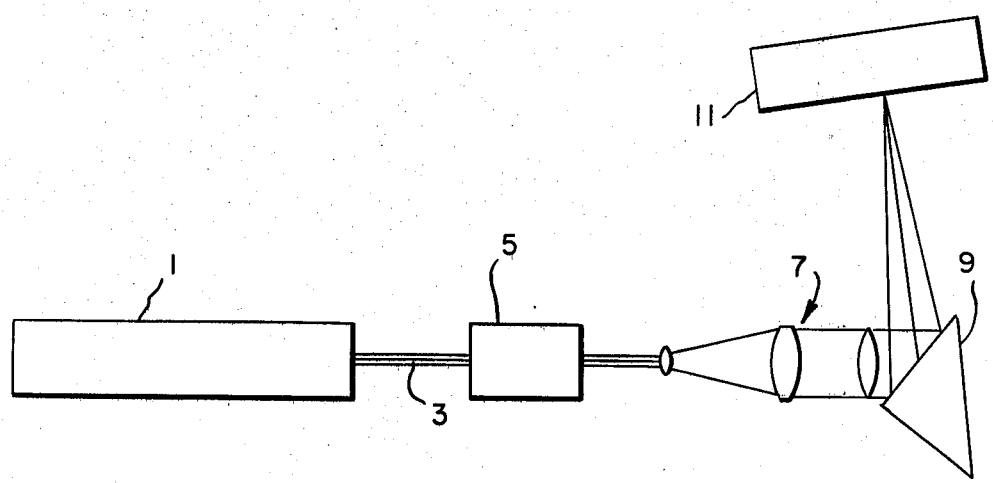
FIG. 6 is a schematic drawing of a typical apparatus for making latent magnetic images in a premagnetized magnetic layer.

U.S. Pat. No. 3,555,556 discloses that in thermal magnetography it is not essential that demagnetization occurs throughout the entire thickness of the premagnetized stratum and that, despite such limited demagnetization, it "can still afford a sensible magnetic gradient", i.e., one that is capable of readout (column 6, lines 50–58). In addition, this patent also mentions that "even when demagnetization is complete in the exposed areas throughout the entire depth of the magnetic stratum, when such areas cool down below the Curie temperature thereof, a certain amount of regenerated magnetism will be apparent therein as a result of the field effect of the surrounding magnetic material in the nonexposed areas." While the above-referred patent discloses that thermoremanent demagnetization through less than the entire thickness of a magnetic layer has been carried out incidentally and that such phenomenon may still result in a latent image capable of readout by some means, it has now been discovered surprisingly that improved field gradients between exposed and unexposed areas of the magnetized layer may be obtained with lower exposures if the depth of demagnetization, through control of the intensity and duration of exposure, is correlated to both the frequency of the premagnetization pattern and the thickness of the magnetic layer.

As used herein, the term "premagnetization" means an imposed alternating magnetic pattern, as opposed to a nonmagnetized or uniformly magnetized layer.

The premagnetization frequency is selected so that the residual magnetic field from the magnetic layer is sufficiently high to induce in the demagnetized area of the layer upon cooling a magnetization of opposite polarity producing a magnetic field of sufficient magnitude to substantially offset the field due to the magnetization in the portion underlying the heated areas. Thus, there are three interrelated variables which are important for this method to function, the variables being (1) the frequency of premagnetization
(2) the thickness of the magnetic layer and
(3) the depth to which the magnetic layer will be demagnetized during exposure.

The demagnetized depth is a function of the duration of the exposure, the penetration of the exposing radiation into the magnetic layer, the absorption characteristics of the magnetic material and the rate of thermal diffusion in the material. If thermal diffusion is to be kept at a minimum, short exposures are desirable. Thermal diffusion is generally undesirable because it tends to expand the exposure area and produce image growth, which reduces resolution.

In selecting the premagnetization frequency, care must be given to stay within limits such that, following exposure and demagnetization of the upper portions of the magnetic layer, the field due to the portion of the magnetic layer under the demagnetized area will still extend completely through and penetrate all the way to the surface of the demagnetized portion with sufficient intensity to produce the required remagnetization as the demagnetized layer cools through its Curie temperature. Even though field strengths of as low as 5 oersteds will produce significant remagnetization, when $CrO_2$ is used as the magnetic layer, it is preferred that a field strength of at least 25 oersteds be available throughout the demagnetized layer to obtain adequate reverse remagnetization.

However, the selected premagnetization frequency is also dependent on the depth of demagnetization in a second manner. Not only must it satisfy the above remagnetization requirement, it must also produce fields on the surface of the magnetic layer that exhibit the largest possible gradient between exposed and unexposed areas.

The following section provides the mathematical tools necessary to calculate the optimum premagnetization frequency, depth of demagnetization due to exposure and thickness of magnetic layer in order to minimize exposure while maintaining good latent image quality.

Mathematical Derivation

The theoretical factors which contribute to the operability of the invention are not fully understood. It is believed, however, that it is due to the reverse remagnetization of the heated layer by the nonheated layer below. A possible explanation may be obtained by utilizing the theoretical relationships disclosed by Schlomann, *IEEE Trans. on Magnetics*, 10, 60 (1974). The theoretical relationships on which the invention is believed to be based can be arrived at mathematically as follows:

In FIG. 1, a premagnetized layer is illustrated schematically which has a thickness d. As shown in FIG. 1, the premagnetization extends the full thickness d of the magnetic layer. In the following calculations and discussion, it is to be understood that d always refers to the premagnetization depth of the magnetic layer, which usually but not necessarily extends through the full thickness of this layer.

The arrow denotes the polarity of magnetization (magnetization vector). Thus, for the magnetic polarity shown in the illustrated layer $$M_x = M_2 \sin kx \quad (1)$$

where $M_x$ is the magnetization vector in the x direction, x is the reference distance and $M_2$ represents its amplitude. k is the spatial frequency equal to, $k = 2\pi/\lambda$ wherein $\lambda$ is the wavelength of the imposed premagnetization in inch/cycle.

Turning now to FIG. 2 of the drawing, as described hereinabove, when the magnetic layer is heated to a depth ($d_1$) above its Curie temperature the layer becomes demagnetized. As it cools down below its Curie temperature the field from the magnetization in layer $d_2$ remagnetizes layer $d_1$ with a magnetization having opposite polarity to that of layer $d_2$. The degree of remagnetization in $d_1$ depends on the strength of the field from the magnetization of layer $d_2$. With reference to FIG. 3 which shows the demagnetized and nondemagnetized portions, $d_1$ and $d_2$ of an exposed layer d, the field in the x direction on the upper surface 2 of the magnetic layer is given by $$H_x = H_r \sin kx \quad (2)$$

where $$H_r = 2\pi M_2(e^{-kd_1} - e^{-kd}) \quad (3)$$

This is a maximum at $$k = \frac{\ln \frac{d}{d_1}}{d - d_1}$$

When $CrO_2$ material is used in the magnetic layer experience has indicated that adequate remagnetization of the $d_1$ layer will occur for values of $H_2 > 25$ Oe.

In FIG. 4 is shown a curve in which $H_2$ is plotted as a function of premagnetization frequency for the particular case where the magnetic layer depth is 10 μm and the demagnetization occurs to a depth of 2 μm.

The magnetic field of the system shown in FIG. 1 can be expressed as follows:

$$(H_o)_x = -2\pi M_2(1 - e^{-kd})e^{-ky} \sin kx \quad (4)$$

$$(H_o)_y = -2\pi M_2(1 - e^{-kd})e^{-ky} \cos kx \quad (5)$$

wherein $(H_o)_x$ and $(H_o)_y$ are the magnetic field strength vector components resulting from the layer before demagnetization.

In FIG. 2 is illustrated the same premagnetized layer of FIG. 1 after it has been thermoremanently demagnetized and remagnetized to depth $d_1$ as described above. The dimension $d_2$ then represents the underlying depth of the layer which retains its original magnetization. Because the magnetization induced into the layer to depth $d_1$ is opposite in polarity to the remaining original magnetization depth ($d_2$) then the magnetic field components ($H_x$ and $H_y$) due to the remagnetized and underlying magnetized layers can be expressed in a manner analogous to equations (4) and (5) above:

$$H_x = 2\pi M_1(1 - e^{-kd_1})e^{-ky} \sin kx - 2\pi M_2(1 - e^{-kd_2})e^{-k(y+d_1)} \sin kx \quad (6)$$

$$H_y = 2\pi M_1(1 - e^{-kd_1})e^{-ky} \cos kx - 2\pi M_2(1 - e^{kd_2})e^{-k(y+d_1)} \cos kx \quad (7)$$

If, then, the term $\alpha$ is substituted for the ratio of $M_1$ to $M_2$ then the ratio of the squares of the magnetic fields in the imaged area and in the unimaged area ($H^2/H_o^2$) can be expressed as follows:

$$H^2/H_o^2 = \frac{[(1 + \alpha)e^{-kd_1} - e^{-kd} - \alpha]^2}{(1 - e^{-kd})^2} \quad (8)$$

Thus, when the demagnetized depth ($d_1$) is 0, the above described function is 1 which indicates that the magnetism in the imaged and nonimaged areas is the same. Thus no latent image exists. From this it is apparent that $H/H_o$ should therefore be as low as possible.

By differentiating the above equation it is found that the function $H^2/H_o^2$ becomes minimum when $Kd_1$ is equal to $$\ln \frac{1 + \alpha}{\alpha + e^{-kd}}$$

This is shown graphically in FIG. 5 which is a plot of the effect of the wavelength of the field originally imposed upon the magnetized layer upon the function $H^2/H_o^2$. Thus there is a relationship among the premagnetization frequency (k) the thickness of the total layer (d), and the demagnetized depth ($d_1$) which will result in a maximum gradient between the fields on the exposed and unexposed areas upon the surface of the layer. When this difference is greatest the image resolution will be highest also. Nevertheless, quite acceptable images can be obtained when this difference is markedly lower. Thus $H/H_o$ can be as high as 0.5 but is preferably no more than about 0.25 or even lower.

Utilizing the correlation of equation 8, the depth of $d_1$ needed to obtain the greatest difference in field strength between the exposed and nonexposed areas of the magnetic layer can be determined at any given wavelength of the original magnetization. This is shown in Table 1 below.

TABLE 1

Exposed Layer Depth ($d_1$) to obtain maximum field strength difference between exposed and unexposed areas

| Magnetic Layer Depth (d) (microns) | Exposed Layer Depth ($d_1$) (microns) |
|---|---|
| 1 | 0.5 |
| 2.5 | 1.1 |
| 5.0 | 1.8 |
| 10.0 | 2.5 |
| 50.0 | 2.8 |
| 100.0 | 2.8 |

(Above data based on $H/H_o = 0$ $1/\lambda = 1000$ cycles/inch and $\alpha = 1$.)

Similarly, with appropriate physical data for the magnetic layer, the above-referred equation (7) can be used to optimize the wavelength of the original magnetization for any degree of image penetration $d_1$ into the magnetized layer, as shown in Table 2 below.

TABLE 2

Optimum Magnetic Field Wave Length as a Function of Image Depth

| Exposed Layer Depth ($d_1$) (microns) | (Wave Length)$^{-1}$ (cycles/inch) |
|---|---|
| 1 | 2789 |
| 2 | 1334 |
| 3 | 728 |
| 4 | 315 |

(d = 10 microns)

A number of assumptions have been made in deriving the above relationships and it should be understood that the derivations disclose optimum theoretical considerations; in practice, adequate energy savings may be obtained even though operation is not always at the optimum point indicated by the above relationships. For instance, it is possible to demagnetize the exposed areas to a greater depth than the calculated $d_1$. It is also possible that as the portion $d_1$ cools down and is remagnetized, it is remagnetized to a distance less than $d_1$ and the remagnetization at or even near the top surface is zero. Yet if the resulting field on the surface is less than 50% of the field in the unexposed areas, good latent imaging will occur albeit with some waste in energy input.

Experimental results support the preceding relationships. For instance, a dispersion of acicular $CrO_2$ particles in a binder comprising polyvinyledene chloride and polyurethane in addition to suitable crosslinkers, plasticizers and stabilizers, was coated on a 0.003 inch polyethylene terephthalate support and allowed to cure, providing a 10 μm thick ferromagnetic layer on the support. This ferromagnetic layer was imprinted with a sinusoidal magnetic pattern across its width in the direction of the coating. The premagnetized pattern frequency selected was 1000 cycles/inch. The premagnetized layer was then imagewise exposed to the output of a Neodymium YAG laser which was modulated through the use of an image-bearing silver halide photographic film as the beam was scanned over the premagnetized layer. Nominal exposure times were about 200 nanoseconds with an exposure level of about 100 mJoules/cm$^2$. This energy level was insufficient to completely demagnetize the 10 μm layer and the demagnetization depth was estimated as about 2 μm; yet when a wet toner which consists of a suspension of toner particles with diameters ranging from 1-3 μm containing very small ferromagnetic iron oxide particles uniformly dispersed in a thermoplastic resin, was applied on the magnetic layer, a good image was made visible.

When the above procedure was repeated using a magnetic layer premagnetized with a pattern having a frequency of 750 cycles/inch the toner image was fair with less contrast than before. When the premagnetization frequency was further reduced to 500 cycles/inch the image quality was judged marginal, and when the premagnetization frequency was reduced to 375 cycles/inch the image was barely discernible.

These results correspond well with the expected results arrived at through the calculation method disclosed above.

Magnetic Layer

The magnetic layer which is imaged in accordance with the invention may consist of finely divided acicular particles of preferably single domain hard magnetic material. This layer may be either self-supporting or it may be supported on another material having suitable properties to withstand the conditions of thermoremanent imaging. In the preferred embodiment, this layer has a thickness of 1.0 to 20 μm. A thickness of 1.5 to 10 μm is still further preferred.

While the data on the invention have been obtained on single magnetic layers, it should be realized that the invention can likewise be used for compound magnetic layers which consist of two or more layers of magnetic particles of same or different Curie temperatures. A particular preferred application of the invention is the use of a compound magnetic layer containing an upper layer of low Curie temperature and a lower layer of much higher Curie temperature. With such configuration of the magnetic layer, the upper layer can easily be primarily imaged to its full depth without any penetration into the underlying high Curie point layer. Within the context of equation (8) the thickness of the low Curie point layer is $d_1$ and the combined thickness of the low and high Curie point layers is d.

While the invention has been described in terms of thermomagnetic materials having a practicably accessible Curie temperature, it will be recognized by those skilled in the art that the invention is also applicable to materials the coercivity of which exhibits a minimum value at some elevated temperature in a manner analogous to the Curie temperature. For example, refer to the Type II thermomagnetic materials discussed on page 999 of the article by A. E. Berkowitz and H. Meiklejohn, *IEEE Transactions on Magnetics*, Vol. Mag-11, July 1975.

Desirably, the material capable of magnetization to the hard, magnetic state will be of particle size of one micron or under, although particles having a maximum dimension as large as 10 microns such as the chromium dioxide particles described by Arthur in U.S. Pat. No. 2,956,955 can be used. Such particles tend to agglomerate and, accordingly, frequently the individual unit dimensions of any one magnetizable area will have agglomerates possibly in the range up to 10 mils. In recording and copying techniques, the resolution is a function of the particle size of the working component involved. The smallest unit which can be charged magnetically is a domain and in small particles the size of the domains is limited by the particle size. Accordingly, the smaller and more uniform the particle size of the material to be magnetized, the better. Preferably, these particles should have a maximum dimension in the range 0.01 to 5 microns, and most especially 0.1 to 2.0 microns. The particulate nature of the magnetic material also serves to limit the spread of the heat image by thermal diffusion, particularly when the particles are bound to each other and to the support with a binder of relatively low thermal conductivity.

Shape anisotropy, or magnetocrystalline anisotropy, can be used in the preparation o the recording members to obtain a preferred orientation of the magnetic particles either in the plane of the coating, or perpendicular to the surface of the tape if the latter is so desired to give a greater demagnetizing penetration of the plate or film for copying.

Similarly, for parallel orientation, i.e., in the coated direction, the cast coating, whether by solvent or by thermoplastic technique, before setting is drawn directly across the pole pieces of a magnet oriented with the field axes thereof in the line of flow of tape movement.

The magnetizable material, which is of the type known as "hard", must be capable of magnetization such that it exhibits an energy product $(BH)_{max}$ of 0.08-8.0 gauss oersteds $\times 10^4$, a remanence B, of 500-21,500 gauss, a coercivity $H_c$ of 40-6000 oersteds, and a Curie point temperature below 1200° C., preferably from 25° to 500° C. Desirably the magnetizable material should also have as high a saturation magnetization, i.e., as is possible consonant with the above-recited desirable property range.

A particularly outstanding species of the magnetic component genus which can be used in making the recording member for use in the present invention is chromium dioxide ($CrO_2$). This material can be used in substantially pure form, or modified with one or more reactive elements. The term chromium dioxide as used in this application is specifically inclusive of the pure form and the modified forms. Suitable descriptions of both the process of preparation and the composition which have the necessary properties will be found in the following illustrative list of issued U.S. Pat. Nos.: Arthur 2,956,955, Arthur and Ingraham 3,117,093, Cox 3,074,778, 3,078,147, 3,278,263, Ingraham and Swoboda 2,923,683, 2,923,684, 3,034,988, 3,068,176 and Swoboda 2,923,685.

The magnetic material forming the magnetizable layer generally will be a particulate hard magnetic material in a binder. Suitable hard magnetic materials include the permanent magnetic materials such as the "Alnicos", the "Lodexes" (acicular iron-cobalt alloys encased in lead or plastic; manufactured by General Electric Company), the "Indox" barium ferrite compositions, and materials used in tape recording, magnetic discs, and magnetic printing inks. These latter materials include -iron oxide ($Fe_2O_3$), magnetite (black $Fe_3O_4$), X-iron carbide and chromium dioxide. Acicular chromium dioxide is generally preferred because of its magnetic properties. The magnetic member preferably is a drum in which case the imaging surface may be an integral part of the drum or it may be a flexible film coated with the magnetic material and mounted on the drum.

Chromium dioxide has a relatively low Curie temperature, and when in the desired particulate form has a relatively high coercivity and a relatively high remanence. Finely particulate chromium dioxide further absorbs light throughout the region of the visible spectrum, i.e., it is black to the exposing light.

The nature of the support on which the magnetizable stratum is coated can vary widely. Such diverse materials as glass, metals and flexible polymers may be used. Flexible polymeric supports are preferred.

In applications when the imaging light is incident on a statum of magnetic material on or in the surface of the support, the nature of the support is not critical. However, when an opaque substantially continuous stratum of hard magnetic material is biased by a second flash of light from behind the recording member, the support should be transparent to light.

The magnetic image can be read out by a variety of methods which will be apparent to those skilled in the art. Included are magnetic reproduction heads (such as those employed in magnetic tape recorders), magnetic toners and inks and magnetooptic methods.

Magnetic inks consist of fine magnetic particles such as black iron oxide dispersed in a suitable fluid medium. The ink particles are attracted by the magnetic field of the magnetized portion of the image and can then be transferred to paper.

Magnetic toners likewise contain a magnetic pigment generally encapsulated in a fusible binder. The magnetic toner can be dispersed in a liquid. The magnetic image on the recording member is then treated with the dispersion. Upon removal of excess dispersion the magnetic image becomes visible by virtue of the toner adhering to the magnetized areas. This process is frequently described as decoration of the magnetic image. The toner image adhering to the magnetic recording member can then be transferred to paper or other substrate material with the aid of pressure. The transferred toner image on the paper can then be rendered more permanent by fusing the encapsulating binder.

Read out can also be effected magnetooptically for example as described in Baaba et al., U.S. Pat. No. 3,229,293.

Referring again to the drawing, FIG. 6 is a schematic representation of a typical system for imposing a latent image onto a layer to ferrmagnetic particles. More particularly a neodymium-doped yttrium aluminum garnet (Nd-YAG) laser 1. is used to generate an intense beam of light 3 which is passed through beam intensity modulator 5 in which the beam is modulated imagewise. From modulator 5, the laser beam in imaged configuration is passed through focusing system 7 and onto scanning mirror 9 from which the laser beam is reflected to the surface of ferromagnetic layer 11, which has been premagnetized with an alternating magnetic field.

We claim:

1. In a process for generating a latent magnetic image on a thermomagnetic layer having imposed thereon an alternating magnetic pattern comprising (1) imagewise exposing the layer to heating radiation by which exposed areas of the layer are heated above its Curie temperature and demagnetized, and (2) cooling the layer to ambient temperature, the improvement comprising:
   (a) selecting the frequency of the alternating magnetic pattern and
   (b) adjusting the intensity and duration of the heating radiation on the basis of the selected frequency of the alternating pattern and the thickness of the magnetic layer, so that the Curie temperature of the layer is exceeded and the layer is demagnetized through less than the complete thickness of the layer to a depth so that the residual magnetic field from the magnetic layer underlying the demagnetized areas of the layer is sufficiently high to induce in the magnetized area of the layer upon cooling a magnetization of opposite polarity producing a magnetic field of sufficient magnitude that the net strength of the residual field and the field due to the induced magnetization on the exposed areas of the layer on the layer's surface is less than 50% of the magnetic field strength of the unexposed areas of the layer.

2. The process of claim 1 in which the ferromagnetic particles are acicular $CrO_2$.

3. The process of claim 1 in which the source of heating radiation is a laser.

4. The process of claim 1 in which the thickness of the magnetic layer is from 1.0 to 20 microns.

* * * * *